July 12, 1955    P. P. WOEHRLE ET AL    2,712,797
CONVERTIBLE LOAD COMPARTMENT FOR FREIGHT VEHICLES
Filed May 31, 1951    7 Sheets-Sheet 1

INVENTORS
Paul P. Woehrle
BY Samuel Eldon Cotter

Ray J. Ernst

ATTORNEY

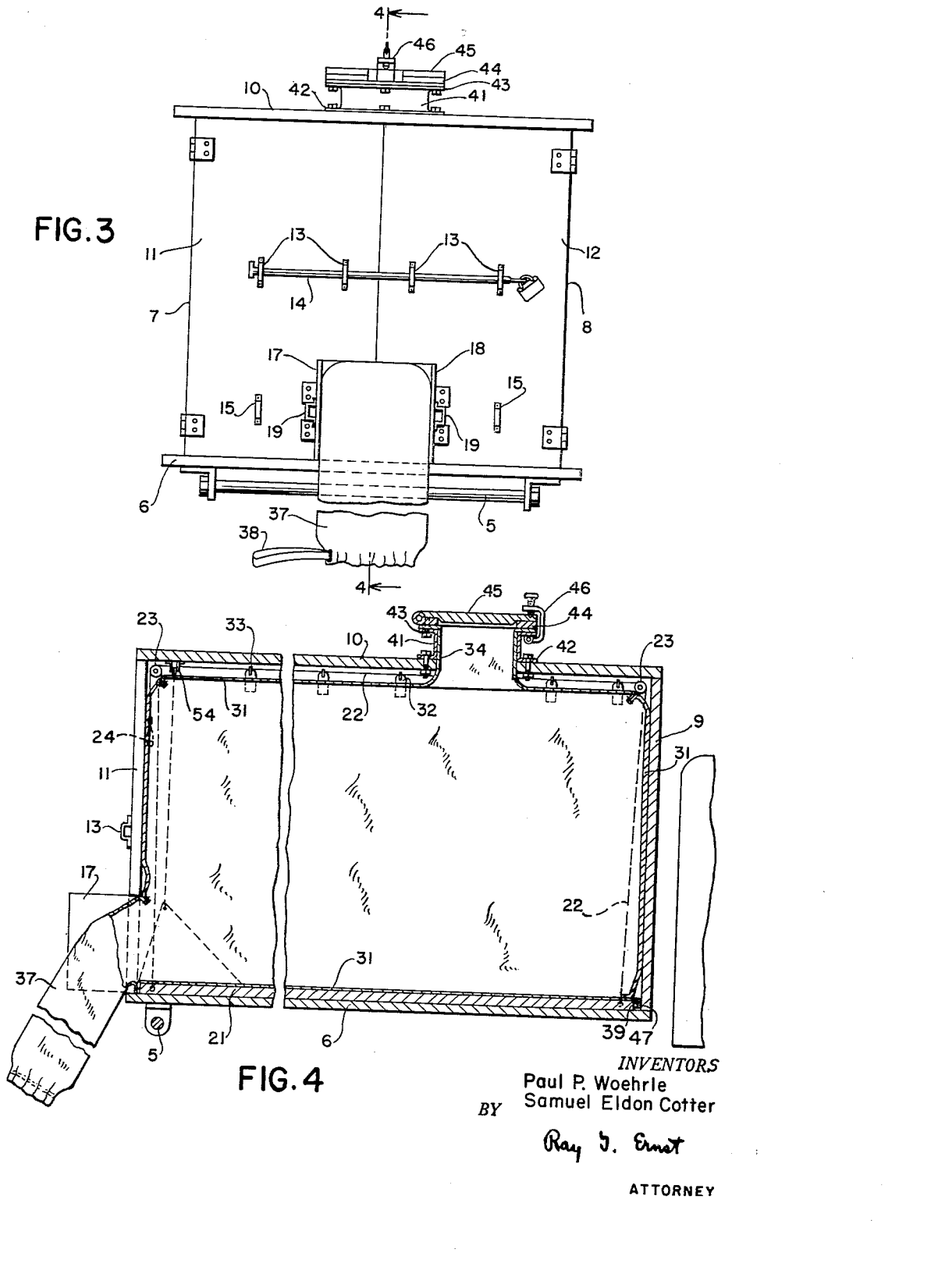

July 12, 1955  P. P. WOEHRLE ET AL  2,712,797
CONVERTIBLE LOAD COMPARTMENT FOR FREIGHT VEHICLES
Filed May 31, 1951                           7 Sheets-Sheet 3
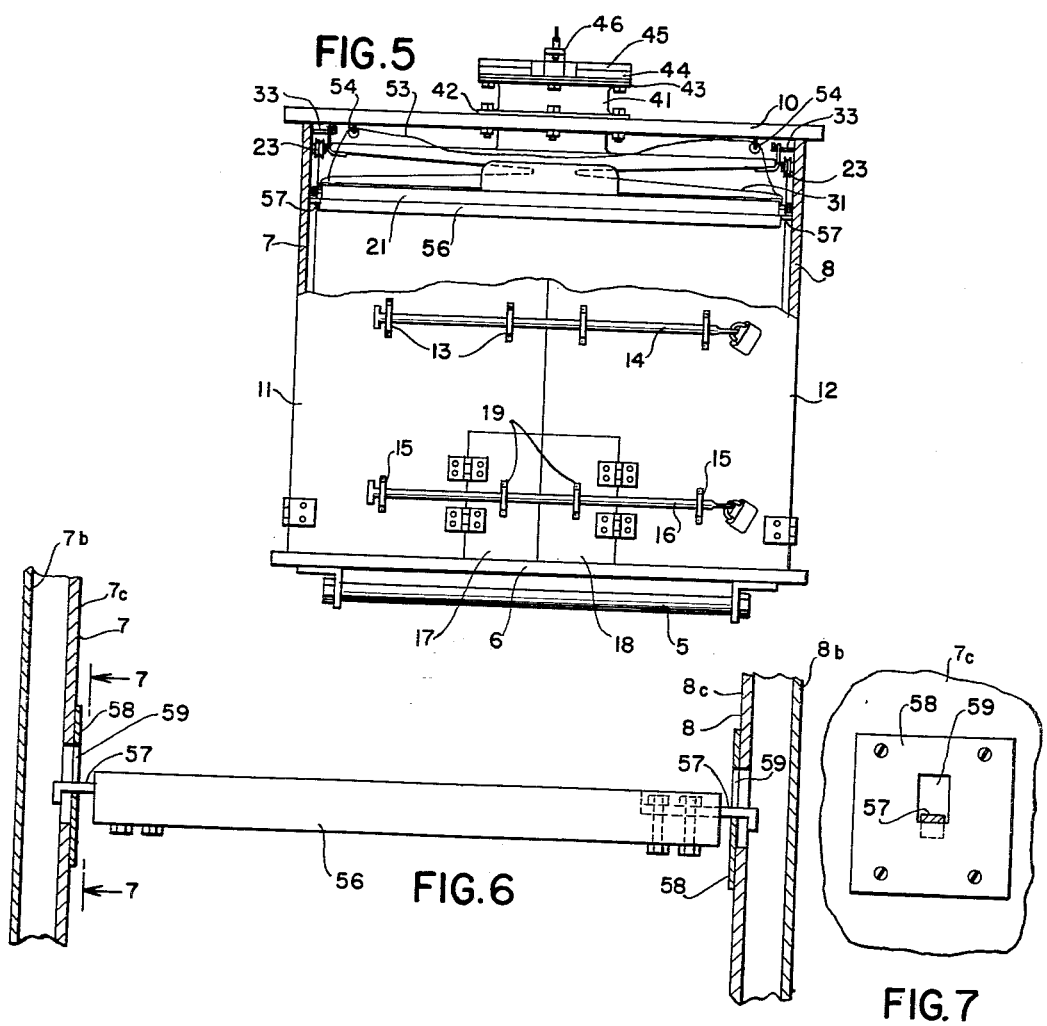
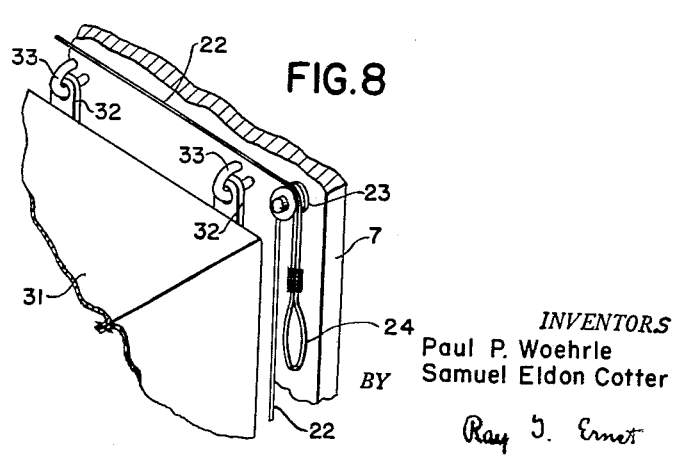
INVENTORS
Paul P. Woehrle
Samuel Eldon Cotter
BY Ray J. Ernst
ATTORNEY July 12, 1955  P. P. WOEHRLE ET AL  2,712,797
CONVERTIBLE LOAD COMPARTMENT FOR FREIGHT VEHICLES
Filed May 31, 1951  7 Sheets-Sheet 5

INVENTORS
Paul P. Woehrle
Samuel Eldon Cotter
BY
Ray J. Ernst
ATTORNEY

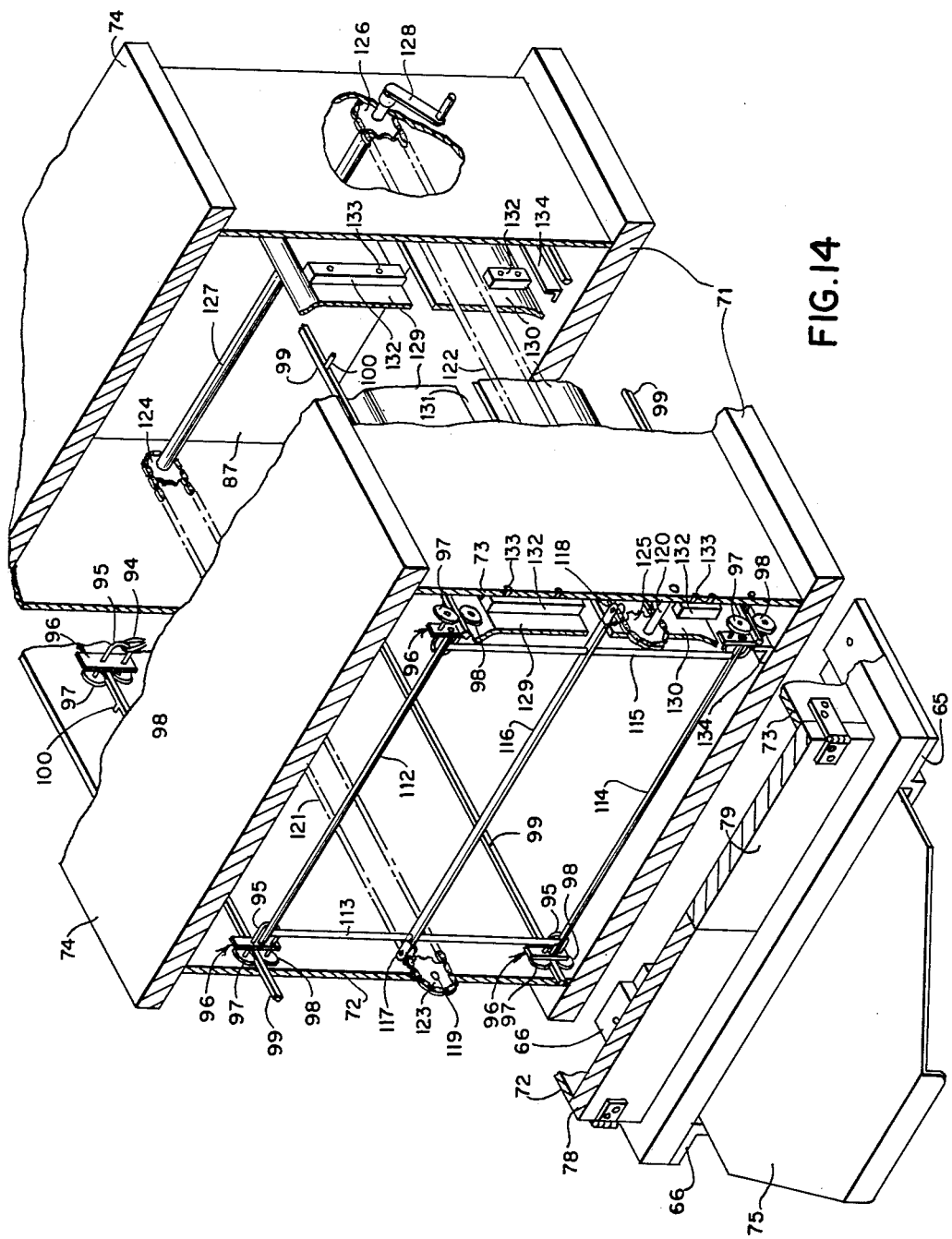

July 12, 1955  P. P. WOEHRLE ET AL  2,712,797
CONVERTIBLE LOAD COMPARTMENT FOR FREIGHT VEHICLES
Filed May 31, 1951  7 Sheets-Sheet 7
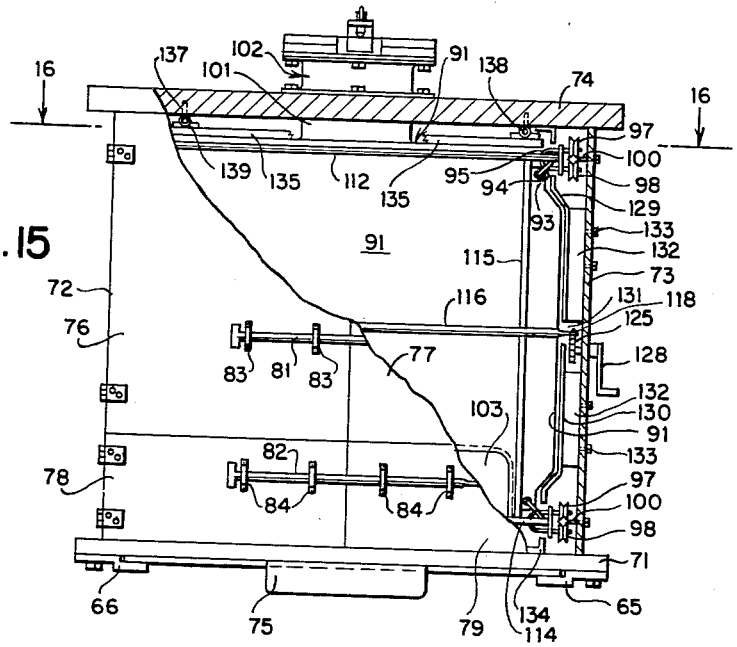
INVENTORS
Paul P. Woehrle
Samuel Eldon Cotter
BY
Ray J. Ernst
ATTORNEY

United States Patent Office 2,712,797
Patented July 12, 1955

2,712,797
CONVERTIBLE LOAD COMPARTMENT FOR FREIGHT VEHICLES

Paul P. Woehrle, Philadelphia, and Samuel Eldon Cotter, Drexel Hill, Pa., assignors to The National Sugar Refining Company, New York, N. Y., a corporation of New Jersey Application May 31, 1951, Serial No. 229,104

12 Claims. (Cl. 105—367)

Our invention relates to vehicles for carrying freight, and more particularly to the load compartment or body of such vehicles.

It is known to equip trucks or trailers for the bulk haulage of granular or pulverulent materials with a load compartment of a closed container type, having a closable inlet opening at the top through which the material may be poured into the compartment, and a closable outlet opening at the bottom through which the material may be poured out of the compartment. Usually the compartment is tiltable to facilitate and secure the discharge of substantially all the material. Such load compartments have the serious disadvantage that they are suitable only for the bulk haulage of granular or like materials, so that when a load of such material is delivered at its destination and, as is usually the case, a return load of similar materials is not available, it is necessary for the truck to make the return trip empty.

An object of the present invention is to provide a vehicle body or load compartment which is suitable for general hauling purposes but may also be converted into a closed container for the bulk haulage of pourable materials, or vice versa, as desired.

Another object is to provide a load compartment which, when converted into a closed container for the bulk haulage of pourable material, will secure especially sanitary conditions.

To accomplish these objects, we provide the conventional load compartment of a freight vehicle, such as the "body" of a truck or truck trailer, with a bag-like liner of flexible material, which liner is extended and filled when granular or like material in bulk is to be transported, and is collapsed against a wall (side, end or top) of the compartment when the compartment is used for general hauling purposes. The liner has a closable fill-in opening at the top, and a closable discharge opening at the bottom.

Other and further objects, advantages and features of our invention will appear or be pointed out hereinafter in conjunction with the description of the two embodiments of the invention illustrated in the drawings, in which Figs. 1 to 10 show a trailer truck with a vertically collapsible liner in its load compartment, and Figs. 11 to 17 a truck compartment structure with a horizontally collapsible liner. In said drawings:

Fig. 3 is another rear end view of the trailer body showing the main upper doors closed and the secondary lower doors open, with the liner outlet spout projecting out through the latter;

Fig. 4 is a broken longitudinal sectional view of the trailer body and liner taken along the line 4—4 of Fig. 3;

Fig. 5 is a rear end view of the trailer body with the upper and lower doors closed and locked in place, and having a portion of the upper doors broken away to show the liner collapsed against the top of the load compartment or body;

Fig. 6 is a part-sectional rear view of the liner-platform supporting latch-bar structure, while Fig. 7 is a side view of the latch plate taken along the lines 7—7 of Fig. 6;

Fig. 8 is a perspective view showing details of the liner suspension means, and the pulley and rope means for lifting the platform to collapse the liner.

Fig. 14 is a broken perspective and sectional illustration of the same trailer body with the liner removed in order to show the liner suspension and collapsing mechanism and the protective panels interposed between the liner and said mechanism;

Fig. 15 shows a rear view of the trailer body with the upper and lower doors closed and a portion of the doors broken away to show the mechanism inside the body;

Fig. 16 is a sectional top view of the rear portion of the trailer body, taken along the line 16—16 of Fig. 15, with the upper doors in closed position, the lower doors in open position, the outlet supporting platform or shelf pulled out into supporting position, and the outlet funnel and spout portions of the liner pulled out over the shelf ready for discharge of bulk material; and Fig. 17 shows, in perspective, a detail of the liner suspension means.

The panels 129, 130, shown in Figs. 14 and 15, which are mounted on each side of the body to form protection between the liner and its supporting and collapsing mechanism, are omitted from Figs. 11, 12, 13 and 16 in order to avoid unduly encumbering these latter figures.

Figure 1:
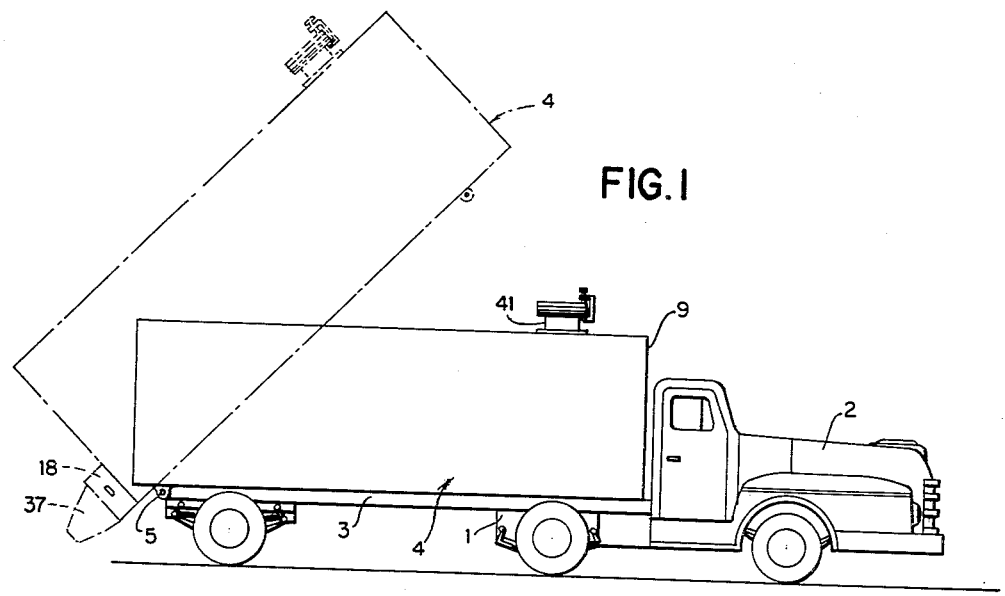
Fig. 1 is a diagrammatic side view of a trailer truck.

The trailer truck according to the first embodiment (Figs. 1 to 10) is designed for attachment to the coupling end 1 of a tractor 2 (Fig. 1). The trailer chassis 3 carries a van-type body 4 which is shown to be tiltable about a pivot shaft 5 of the chassis 3 in the manner of a dump truck, the tilting power being derived from the power plant (not illustrated) of the tractor. Fig. 1 shows in full line the body 4 in its normal position, and indicates by dash and dot lines the tilted position of the body. A tilt angle of at least 45 degrees is usually desirable for both filling and discharging of the bulk cargo. It will be understood that the trailer body need not be tiltable with respect to the chassis if provisions are made for tilting the entire truck or trailer, for instance, by driving the truck onto a platform whose front end can be elevated to obtain the desired slope.

Figure 2:
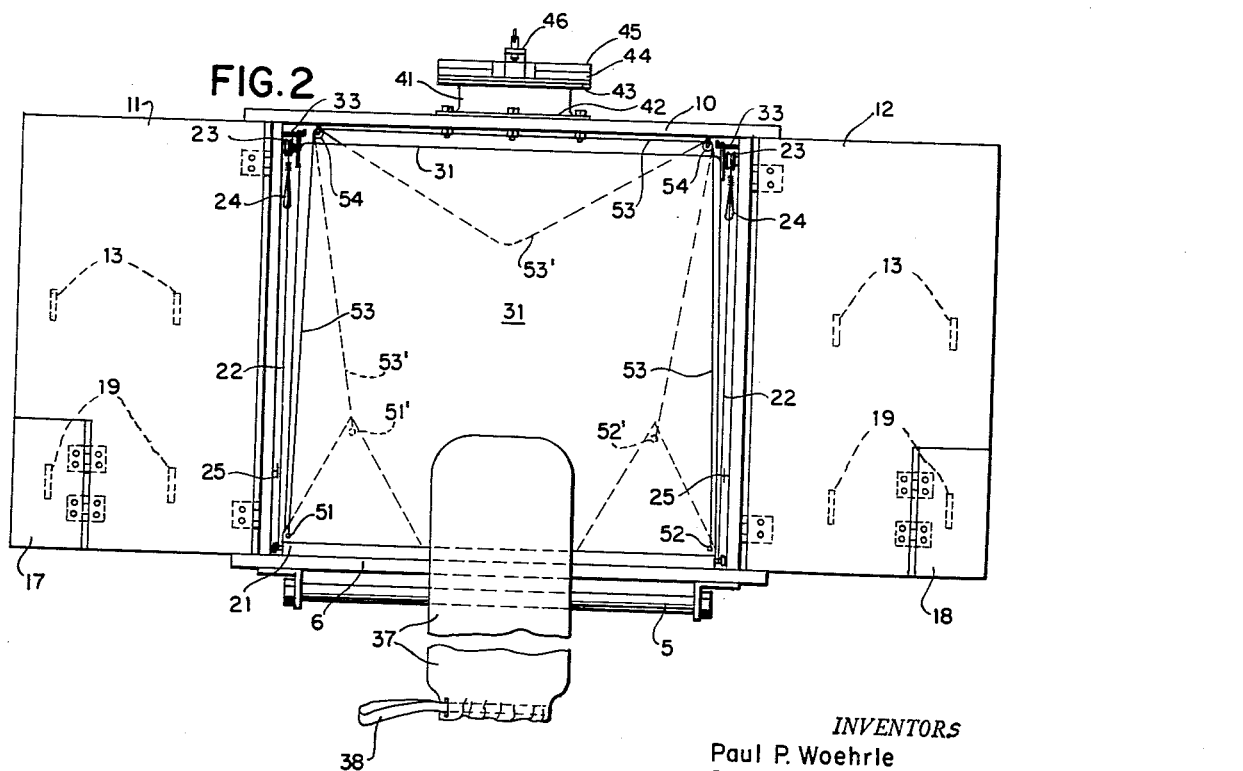
Fig. 2 is a rear end view of a trailer body according to the invention, the trailer doors being open to show the liner therein.
Figure 9:
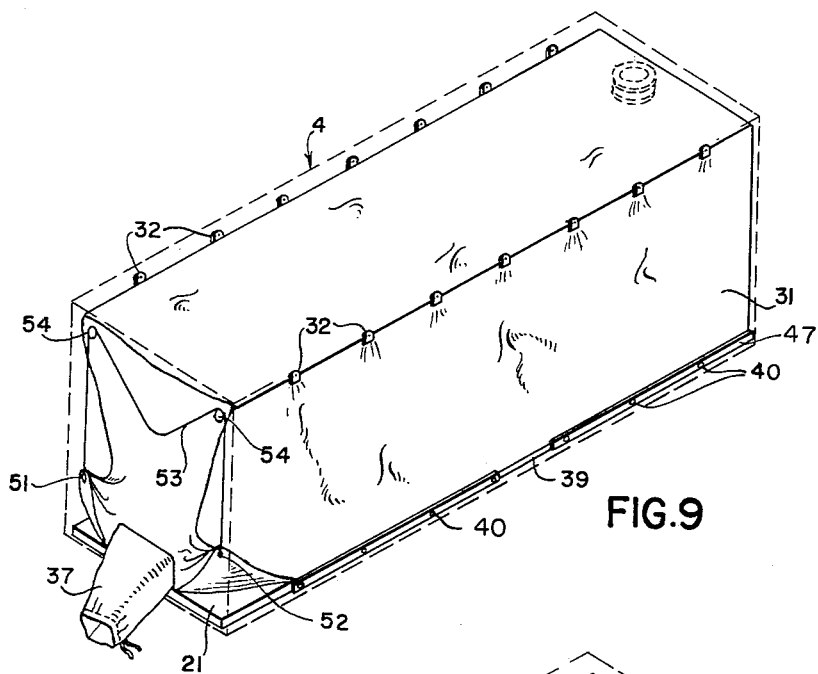
Figs. 9 and 10 are perspective schematic views showing the liner in downwardly expanded and in upwardly collapsed positions, respectively.
Figure 10:
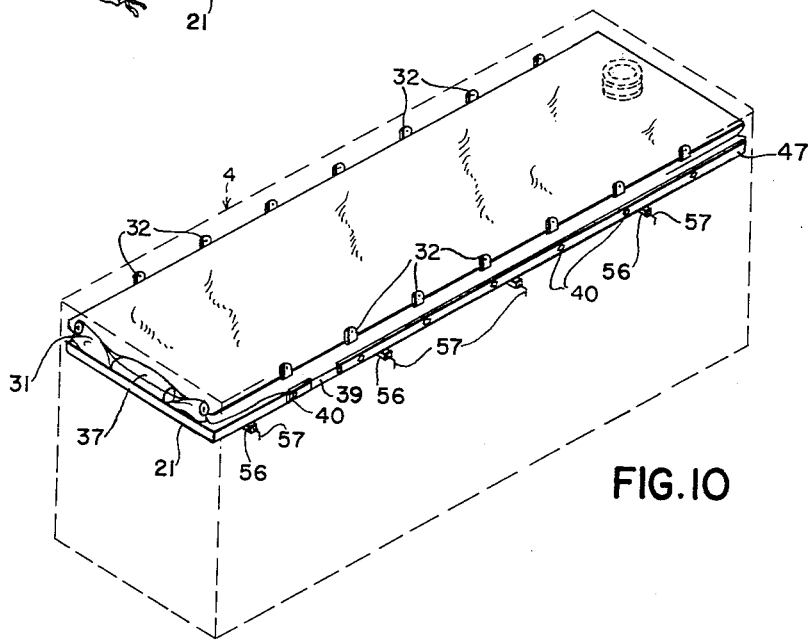
Figure 11:
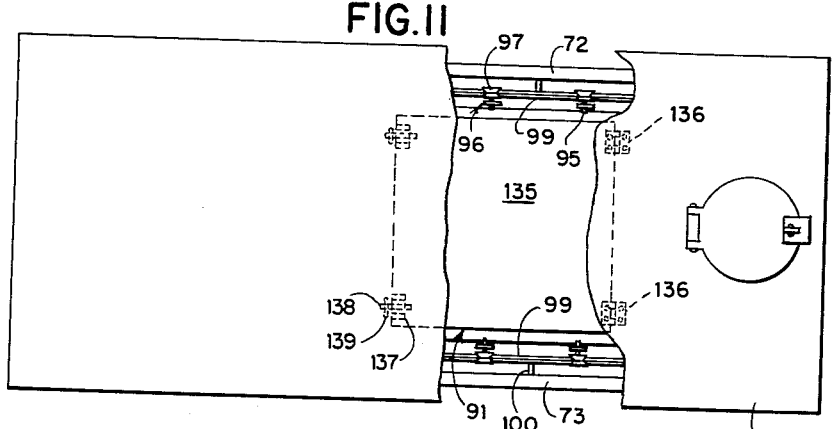
Fig. 11 is a top view of the trailer body of the second embodiment of the invention, with a portion of the top broken away to show the liner in expanded condition.

As shown in Figs. 2, 4 and 5, the trailer body or load compartment is composed of a floor 6, side walls 7 and 8, front wall 9, and a top wall 10. The rear end of the trailer body is provided with main double-wing doors 11 and 12 vertically hinged to the respective side walls and equipped with eye members 13 for the passage of a latch rod 14 (Figs. 3 and 5). When the main doors are closed, and the rod 14 is placed through the eye members 13 and locked in position, the doors are rigidly braced so that they form a secure bulkhead capable of withstanding the pressure which may be exerted upon them by the cargo.

The main doors 11 and 12 are provided at their lower wing corners with the secondary doors 17 and 18 respectively which, as will be explained hereinafter, are of a size to permit the discharge spout of the liner to pass therethrough. Latch bar 16 (Fig. 5) may be passed through eye members 15 on main doors 11 and 12 and eye members 19 on secondary doors 17 and 18 to lock the latter in closed position.

Disposed within the body of the trailer is a platform or false bottom or partition member 21 whose dimensions conform generally to the inside dimensions of the load compartment but are slightly less than the latter in order that the platform may be raised and lowered (Figs. 2, 4, 9 and 10). Attached to the corners of platform 21 are ropes 22 on each side of the compartment. The ropes on each side are attached to the front and rear corners of the platform on the respective side, so that all four corners are attached. The ropes pass over pulleys 23 mounted at the top of the compartment and are provided with pull handles 24 (Figs. 2, 4 and 8). When these handles are pulled, the platform 21 is lifted from the compartment floor toward the top wall 10 to the position shown in Figs. 5 and 10. The platform may then be held in top position by securing the handles to cleats or buttons 25 mounted on the side walls of the compartment at a suitable place near the bottom. If desired, of course, a crank-operated hoist drum or other suitable device may be provided to lift the platform.

A bag-shaped liner 31 (Fig. 4), having its bottom portion secured to the platform 21, is disposed within the trailer body. This liner may be made of any of the various materials depending upon the particular cargo or the particular conditions of use. For instance, a liner of pre-shrunk canvas, rayon or other textile may be used. These fabrics may be treated to be fireproof, waterproof, mildewproof, as well as more or less resistant to acids and alkalies, if desired. The liner should be slightly larger than the inner dimensions of the load compartment, so that the liner, when loaded with bulk cargo, is not subjected to appreciable tensile stress at any point, the load being taken by the walls. It is further desirable to suspend the liner in such a manner as to position it substantially in conformity on all sides with the inside shape of the compartment. For this latter purpose, a number of tabs 32 (Figs. 8, 9 and 10), provided with eyelets, are stitched, riveted, or otherwise fastened to the liner along the top side edges of the liner, and are attached to hooks 33 (Fig. 8) or other suitable fastening devices mounted at corresponding points in the upper corners along the length of the compartment. The bottom side edges and the front edge of the liner are suitably provided with flange-like fabric strips 39 which are secured to the side edges of platform 21 by means of metal clamping strips 47 and countersunk screws 40.

The top of liner 31 is equipped with a neck portion 34 (Fig. 4) through which the bulk cargo may be poured into the liner. More than one neck portion may be employed if desired. The rear end of the liner is provided with a discharge neck or spout 37 whose end may be tightly closed by means of a draw string 38 or like closing device (Figs. 2, 3 and 4). The spout 37 conforms in cross-section to the small bottom doors 17 and 18, so that the spout may be passed through the door opening for the discharge of material while the main doors 11 and 12 of the trailer body remain safely closed and locked. The discharge spout may be made of the same material as the liner and, if desired, may be given sufficient length to reach the feed hopper of conveying or elevating equipment. To prevent contamination of the delivered material, a sealable connection is preferable. It is sometimes also desired to adjust or regulate the rate of discharge of the bulk product. In cases where the above-described draw string is insufficient for such an adjustment an iris-diaphragm type of discharge valve or an industrial-size pinch cock in the discharge spout may be provided. In any event, the discharge spout should be sufficiently flexible to permit being folded or rolled up just inside the vehicle doors when not in use.

The top wall 10 of the trailer body has one or more inlet openings depending upon the number of inlet necks 34 of the liner. Each inlet is formed by a flanged annular nipple 41 having a lower flange 42 which is rigidly secured to the top wall 10 and an upper flange 43 over which the end portion of the spout 34 is turned (Figs. 3 and 4). A pressure ring 44 is then laid over this end portion of the spout and presses it down tight against the flange 43. Hinged to the pressure ring 44 is a lid 45 which can be tightly sealed by a locking clamp 46 (Fig. 4).

When discharging the bulk cargo, even though the trailer body is tilted at an angle of 45 degrees or more, some material may be caught in the lower corners of the bag-like liner and thus be difficult to discharge. To accomplish its discharge, the illustrated embodiment is equipped with a second pulley device whose pull rope 53 extends over pulleys 54, mounted at the top of the compartment, to tabs 51 and 52 at the lower rear corners of the liner bag (Fig. 2). When the liner is expanded, the rope 53 passes with very little slack from the bag corner tab 51 over the pulleys 54 to the corner tab 52. As the unloading of the bulk cargo proceeds, and the discharge of the liner bag nears completion, the primary doors 11 and 12 may be opened, since they are then no longer needed to support the outward pressure of the load, and the pulley rope 53 may then readily be pulled down to the position indicated in Fig. 2 by the dot and dash line 53'. This causes the corner tabs 51 and 52 to be lifted to the positions shown at 51' and 52' (see also Fig. 9), so that the rear end of the liner becomes more or less funneled, and any material caught in the rear corners will flow toward the centrally located discharge spout 37.

When the bulk cargo has been fully discharged, and it is desired to convert the load compartment into a form suitable for general cargo or freight purposes, the platform 21 may be raised up toward the top wall of the compartment by pulling down on the handles 24, thus collapsing the liner 21 between the platform and the top wall. The platform may then be held in upper position by fastening the handles 24 to cleats or buttons 25.

In order to make the platform more secure in its upper position, an additional supporting means in the form of a number of cross bars 56 is provided (Figs. 5, 6, 7 and 10). Each bar 56 is somewhat shorter than the inner width of the loading compartment and has two latch hooks 57 firmly secured to its respective ends and projecting beyond the bar ends so that the overall length of the bar member is larger than the inner width of the loading compartment. The bars 56 may be made of wood as indicated, or they may be made of metal in which case the hooked ends may be integral parts of the structure. Each side wall 7, 8 of the compartment has a number of holes covered by respective latch plates 58 (Figs. 6 and 7) that are securely set in the respective side walls. These holes and plates are located at an appropriate point near the ceiling so that the plate holes 59 lie closely below the platform 21 when the platform is in fully raised position. Each latch bar 56 may then be hooked into the openings of two opposite latch plates 58 by holding the bar 56 flat against the platform 21 and at an angle to the direction of the width of the platform, then inserting one of the hooks 57 into the hole 59 of the latch plate 58 at one side wall of the compartment so that the bar end abuts against the latch plate, and thereafter shifting the other end of the bar 56 until its hook 57 registers with the opening of the adjacent latch plate and drops into latching engagement. With all bars 56 thus secured in position, the bag-lifting pulley ropes can be relieved, and the weight of liner and platform can be taken entirely off the pulley ropes and placed on the cross bars 56.

When the liner is in its upper position in collapsed condition (Fig. 10), the platform 21 forms the top wall of the load compartment and the interior is available for general hauling purposes just like an ordinary van. On the other hand, when the liner is in its lower position in expanded condition (Fig. 9), the platform 21 rests on the floor of the compartment and protects the bottom of the liner bag from moisture, dirt and refuse which might accumulate on said floor as the result of general haulage.

To prevent binding or undue abrasion of the liner when in use, it is preferable to have the vertical sides of the trailer body lined with a suitable material such as stainless steel, galvanized iron, plywood or wood composition boards. For instance, as shown in Fig. 6, the side walls 7 and 8 of the truck body may be composed of an outer portion 7b or 8b and an inner portion 7c or 8c spaced therefrom, the inner portion consisting, for instance, of wood composition board or plywood. The spacing of the inner and outer portions provides a heat insulating effect. The insulation can be made more effective by filling the space with heat insulating materials such as rock wool or fibre glass. Heat insulation is important for the prevention of "caking" of many crystalline materials such as sugar that might be transported in bulk.

The embodiment illustrated in Figs. 11 to 17 differs in general from the one above described, in that the liner, instead of being expansible and collapsible in the vertical direction, is expansible and collapsible in the horizontal direction.

The trailer body is composed of a floor 71, side walls 72, 73, a roof or top wall 74 and a front wall 87, generally in the manner customary for van-type trucks and trailers. The floor 71 is equipped with a rear extension platform or shelf 75 (Figs. 14, 15 and 16), which when extended forms a support for the converging or tapered discharge end 103 of the liner bag during unloading of bulk cargo. Brackets 65 and 66 attached underneath the floor 71 provide a slot-like construction in which said platform 75 is supported and into and out of which it is slidable, so that it may be pulled out for use or stored away as desired.

The rear end of the body is equipped with upper, main doors 76 and 77 of relatively large size, and bottom secondary doors 78 and 79 of smaller size. The main doors 76 and 77, when closed, may be braced and locked in position by means of a latch bar 81 passing through eye members 83. The bottom doors 78 and 79 are similarly lockable by means of a latch bar 82 passing through eye members 84.

As is apparent from Fig. 16, the small secondary doors 78 and 79 may also be rigidly braced and locked in partly opened position. To this end, an additional latch bar 85 of curved shape is provided (Fig. 16). This bar is passed through the eye members 84 and has openings at both ends to receive locking bolts or pins 86. When these small secondary doors are braced and locked in the partly opened position shown, they conform to the converging hopper-like shape (at 103) of the rear end of the liner bag and thus take up the rearward pressure against this portion of the liner while bulk cargo is being discharged. Moreover, when the secondary doors are thus opened, space is provided between the inner wing edges of the doors for the emergence of the spout 104. The upper main doors 76, 77 are kept in locked position until a sufficient amount of the cargo has been poured out, in order to support the lining material against the rearward pressure of the load.

The liner bag 91 (Figs. 12, 15, 16 and 17) is dimensioned in accordance with the principles explained in conjunction with the first described embodiment. Essentially, the liner is sufficiently large to fill substantially the entire inner space of the trailer body when the liner is loaded with bulk cargo, so that the weight and pressure of the load are transmitted to the walls of the vehicle body and prevented from imposing undue strain upon the liner material.

Figure 12:
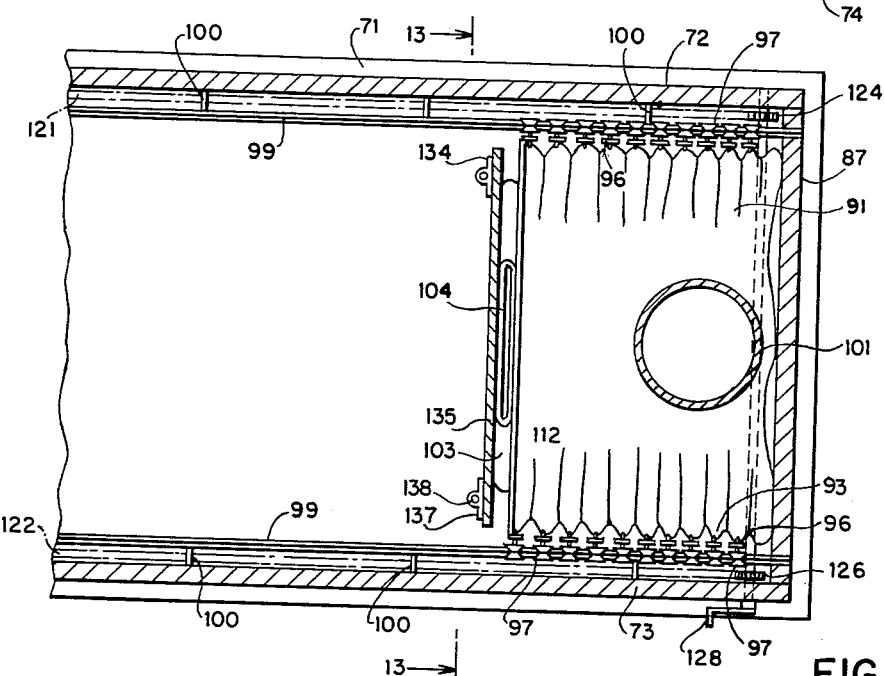
Fig. 12 is a sectional top view showing the liner collapsed in the direction horizontally against the front wall of the load compartment.
Figure 13:
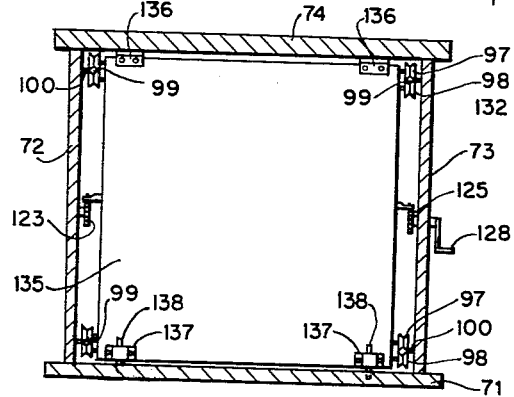
Fig. 13 is a sectional rear view with some details omitted, taken along the line 13—13 of Fig. 12.

The liner bag is secured to the front-end wall 87 of the vehicle body in any suitable manner and has a number of tabs 93 (Fig. 17) distributed along the two upper and the two lower longitudinal edges. Each tab 93 has an eyelet engaged by a hook 94 which is hung into a loop 95 of a roller carrier 96 with two grooved rollers 97 and 98 (Figs. 11, 12, and 14 to 17). In the illustrated embodiment, four square guide rails 99, set so that the edges point vertically and horizontally, extend along the two upper and two lower longitudinal corners of the load compartment, although it should be understood that in some cases only two guide rails along the upper edges of the vehicle body may be sufficient. Each guide rail 99 is straddled by a suitable number of pairs of grooved rollers 97, 98 corresponding to the number of tabs on the adjacent longitudinal edge of the liner bag (Figs. 12, 14 and 15). In this manner, the liner is suspended and guided along the rails 99 in curtain fashion and can readily be extended by having its rear end pulled back out of its storage space at the front of the trailer body and, when discharged, can be collapsed by having its rear end pushed forward into the storage space. The guide rails 99 are rigidly secured by bolts or brackets 100 to the adjacent side walls of the vehicle body. These guide rails are mounted close to the body walls, or recessed in these walls, so as to be as much out of the way as possible.

The liner 91 is provided at the top near the front end with a neck portion 101 which is fitted into a closeable inlet structure indicated generally as 102 provided in the top wall of the vehicle body. This inlet structure is the same as that described in detail in connection with the first embodiment of the invention (Figs. 1 to 10), and consequently need not be described further here. It will be noted, however, that while an upwardly collapsible liner according to the first embodiment may be equipped with more than one inlet, a horizontally collapsible liner according to the second embodiment usually is limited to a single inlet near the front end of the vehicle body. Therefore, a complete filling of the liner with bulk material usually requires tilting of the body at an angle of at least about 45 degrees. As in the case of the first embodiment, the tilting, both for filling and discharging, is preferably accomplished by having the body tiltable relative to its chassis in the manner of a dump truck, but if desired it could also be accomplished by means of a tiltable platform on which the truck or trailer is placed.

As shown in Fig. 16, the rear end of the liner bag 91 preferably has a tapering, vertically shallow, funnel-shaped portion 103 converging into a discharge spout 104. The height of the funnel portion 103 matches that of the bottom doors 78, 79 (Fig. 15), so that this funnel portion may be pulled out of the load compartment when the bottom doors 78 and 79 are moved to and locked in the partly open position shown in Fig. 16, and will then abut against said doors. At the same time, the platform 75 may be pulled out into the extended position shown in Fig. 16 where it affords a bottom support for the liner portion 103. The upper doors 76, 77 are kept in locked position as long as necessary to afford support for the liner against the pressure of the load.

It will be understood that the spout and door arrangement of the first embodiment of the invention (Figs. 1 to 10) could be used with the second embodiment (Figs. 11 to 17), and vice versa.

To facilitate collapsing and extending the liner bag 91, the vehicle body is further equipped with a push-pull frame or partition member composed of bars, rods or tubes such as those denoted by 112, 113, 114, 115, 116

(Figs. 14 and 15) which are rigidly joined together, for instance, by welding or other suitable means. The upper cross rod 112 of the frame is secured to the two upper rear roller carriages 96, while the bottom cross rod 114 is similarly secured to the two lower rear roller carriers 96. The tabs 93 on the four rear corners of liner 91 are also secured through their hooks 94 with the loops 95 of these four roller carriages. The liner may also be attached at other points on the push-pull frame if desired. The intermediate cross rod 116 has its two ends linked at 117 and 118 to respective endless sprocket chains 121 and 122. Chain 121 passes over sprocket wheels 123 and 124, while chain 122 passes over sprocket wheels 125 and 126. Sprockets 123 and 125 are freely revolvable about respective axle pins 119 and 120 mounted in and projecting out from the side walls of the vehicle body. The two sprockets 124 and 126 are rigidly attached to a connecting shaft 127 which extends to the outside of the vehicle body and has a coupling end engageable by a removable crank 128 or other means for rotating the shaft.

Fig. 14 shows the push-pull frame structure 112, 113, 114, 115, 116 in a position at the rear of the truck body corresponding to a fully extended liner bag (for simplification, the liner bag itself is omitted from this figure). Assuming that the liner bag is empty and is to be folded into its storage space at the front, it is merely necessary to turn the crank 128 clockwise in order to push the frame structure along the tracks 99 toward the front of the body, thereby collapsing the liner bag against the front wall. By reverse movement of the crank, the stored bag can readily be pulled out to expanded position.

In order to protect the liner bag from the chain mechanism and the roller and rail mechanism, and vice versa, a protective panel construction is interposed therebetween. This construction is illustrated in Figs. 14 and 15, where it is shown only as applied to the right-hand side wall 73. It will be understood, however, that the left-hand side wall 72 is similarly equipped. The construction consists essentially of the two panels 129 and 130 extending longitudinally of the load compartment substantially the length of the tracks 99. These panels are spaced vertically from each other a sufficient distance to provide a slot-like passageway 131 through which the end of bar 116 may pass in order to permit the sliding to-and-fro movement of the push-pull frame. Panel 129 at its upper portion is curved inwardly and then upwardly to take a shape best calculated to hold the liner 91 away from the track and roller mechanism at that point. Panel 130 is similarly curved at its lower portion. These panels are secured to and suitably spaced from the side walls 72 and 73 by being bolted to the side walls through a series of blocks 132, the bolts being indicated at 133. If desired, a complementary angle piece 134, secured to the bottom 71 and extending along the length of the track 99, may also be provided in order that the bottom of the liner or bag 91 may not be forced in under the track and roller mechanism. As hereinbefore stated, the liner or bag 91 has been omitted from Fig. 14 in order that the other parts of the structure may be more clearly shown.

When the liner bag is fully collapsed into its storage space at the front end of the body, the remaining major portion of the body space is available for general hauling purposes and the full height of that space can be utilized. The push-pull frame structure then acts somewhat as a partition which, in many cases, is sufficient for protecting the liner from being damaged. More protection may be obtained by covering the frame with plywood, sheeting or the like, leaving of course an opening therein of sufficient size to permit the spout and converging portion of the liner to be extended out therethrough when unloading from the liner. If desired, a separate partition may be used to shut off the storage space.

An example of a separate partition in the form of a swinging door is illustrated in Figs. 11, 12, 13 and 15. The door 135 is hinged at 136 to the top wall 74. Fixed at the bottom of the door are the bar locks 137 having the slide bars or pins 138 preferably downwardly pressed by spring action. When the liner is not in use and is collapsed against the front wall of the compartment, as shown in Fig. 12, the door 135 is swung down about its hinges, and the bars 138 are moved into downward position where they enter into holes (not shown) provided in the floor and thus lock the door in vertical position. On the other hand, when the liner is in expanded position (Figs. 11 and 15), the door is swung upward about its hinges to a position flat against the top wall or ceiling, and the bars 138 engage in eye members 139 projecting down from the ceiling whereby the door is locked in this upper position.

While the embodiments illustrated show only one discharge spout or outlet at the rear end of the liner bag, a plurality of such outlets may, of course, be provided if desired.

It will be obvious to those skilled in the art that other modifications and variations may be made without departing from the spirit of the invention.

We claim:

1. In a vehicle, a load compartment having a top wall, a bottom wall, and side and end walls, a bag-like container of flexible material disposed in said compartment and conforming when expanded substantially to the interior space of said compartment as though a liner thereof, said container having top inlet means and bottom outlet means accessible from the outside of said compartment when said container is expanded, means for supporting the top of said container adjacent the top of said compartment, and means for collapsing said container against and expanding it from one of said walls.

2. In a vehicle, a load compartment having a top wall, a bottom wall, and side and end walls, a bag-like container of flexible material disposed within said compartment and conforming when expanded substantially to the interior space of said compartment as though a liner thereof, said container having top inlet means and bottom outlet means accessible from the outside of said compartment when said container is in expanded position, means for supporting the top of said container adjacent the top of said compartment, and means comprising a partition member for collapsing said container against and expanding it from one of said walls, said partition member separating said container from the rest of said compartment space when said container is collapsed.

3. In a vehicle, a load compartment having a top wall, a bottom wall, and side and end walls, a bag-like container of flexible material disposed in said compartment and conforming when expanded substantially to the interior space of said compartment as though a liner thereof, said container having top inlet means and bottom outlet means accessible from the outside of said compartment when said container is expanded, means for supporting the top of said container adjacent the top of said compartment, a platform secured to the bottom of said container, and means for raising and lowering said platform to respectively collapse said container against and expand it from said top wall.

4. A vehicle load compartment structure according to claim 3, in which the platform is of a size and shape conforming to the vertically free space in said compartment.

5. In a vehicle, a load compartment having a top wall, a bottom wall, and side and end walls, a bag-like container of flexible material disposed in said compartment and conforming when expanded substantially to the interior space of said compartment as though a liner thereof, said container having top inlet means and bottom outlet means accessible from the outside of said compartment when said container is expanded, means supporting the top of said container adjacent the top of said compartment, a platform secured to the bottom of said container, pulleys mounted in said compartment adjacent the top, and lifting ropes attached to said platform and extending over said pulleys for raising and lowering said platform to respectively collapse and expand said container.

6. In a vehicle, a load compartment having a top wall, a bottom wall, and side and end walls, a bag-like container of flexible material disposed in said compartment and conforming when expanded substantially to the interior space of said compartment as though a liner thereof, said container having top inlet means and a centrally located discharge spout at its bottom rear accessible from the outside of said compartment when said container is expanded, means for supporting the top of said container adjacent the top of said compartment, means for raising the bottom rear corner portions of said container to facilitate discharge through said spout, and means for collapsing said container against and expanding it from one of said walls.

7. In a vehicle, a load compartment having a top wall, a bottom wall, and side and end walls, a bag-like container of flexible material disposed in said compartment and conforming when expanded substantially to the interior space of said compartment as though a liner thereof, said container being secured to an end wall and having top inlet means and bottom outlet means accessible from outside said compartment when said container is expanded, means for supporting the top of said container adjacent the top of said compartment, and means for collapsing said container against and expanding it from said end wall.

8. A vehicle load compartment structure according to claim 7, in which the top of said container is slidably supported on guide rails mounted adjacent the top and extending longitudinally of said compartment.

9. In a vehicle, a load compartment having a top wall, a bottom wall, and side and end walls, a bag-like container of flexible material disposed in said compartment and conforming when expanded substantially to the interior space of said compartment as though a liner thereof, said container being secured to an end wall and having top inlet means and bottom outlet means accessible from the ouside of said compartment when said container is expanded, guide rails mounted adjacent the top and extending longitudinally of said compartment for slidably supporting the top of said container, a push-pull partition member longitudinally movable within said compartment, means for guiding said longitudinal movement, said container being attached to said partition member so as to be collapsed and expanded due to the respective movements of said member, and means for actuating said member.

10. A vehicle load compartment structure according to claim 9, in which the means for guiding said partition member comprises said guide rails.

11. A vehicle load compartment structure according to claim 1, in which the rear wall of said compartment comprises doors, said compartment carries a platform adapted to be moved into a position forming an extension of said compartment bottom wall, and said container outlet means comprises a spout-like container portion adapted to be extended beyond the compartment space and onto said exterior platform when said doors are opened and said platform is extended.

12. A vehicle load compartment structure according to claim 1, in which the rear wall of said compartment comprises doors, said compartment carries a platform adapted to be moved into a position forming an extension of said compartment bottom wall, said container outlet means comprises a tapering container portion merging into a discharge spout, which container portion is adapted to be extended beyond the compartment space and onto said exterior platform when said doors are opened and said platform is extended, and locking means for locking said doors at an open position forming an angle corresponding to said tapering container portion so that the latter portion will uniformly abut against said doors and the discharge spout will extend out through said doors.

References Cited in the file of this patent
UNITED STATES PATENTS

| | | |
|---|---|---|
| Re. 22,876 | Gray et al. | May 13, 1947 |
| 172,228 | White | Jan. 11, 1876 |
| 1,262,025 | Dickson | Apr. 9, 1918 |
| 1,898,195 | Lorenz | Feb. 21, 1933 |
| 2,377,989 | Braun | June 12, 1945 |